Jan. 24, 1961  W. I. NAXON ET AL  2,969,107
CONVERTIBLE SEAT
Filed Feb. 4, 1960
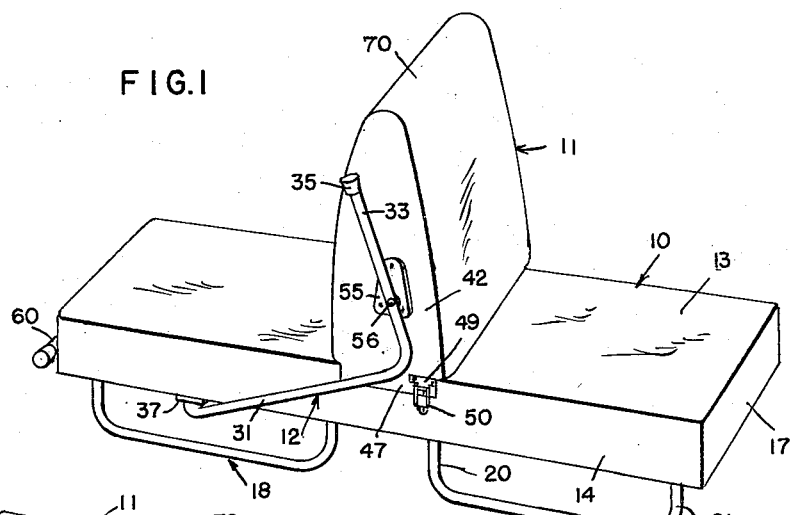
FIG.1
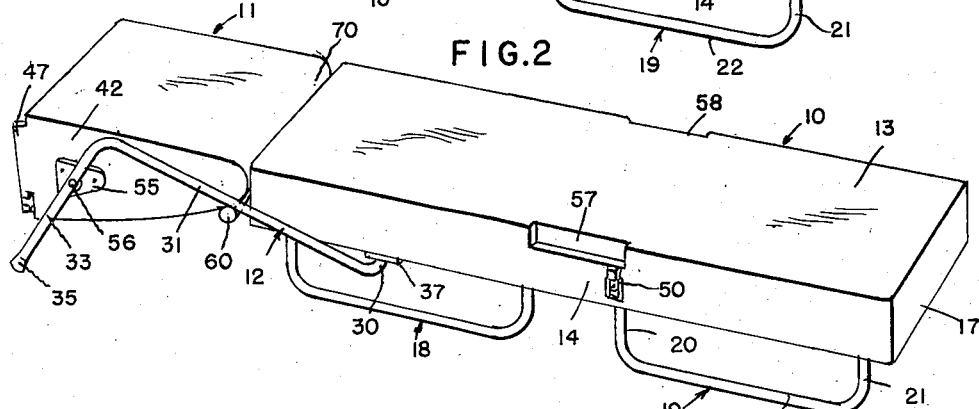
FIG.2
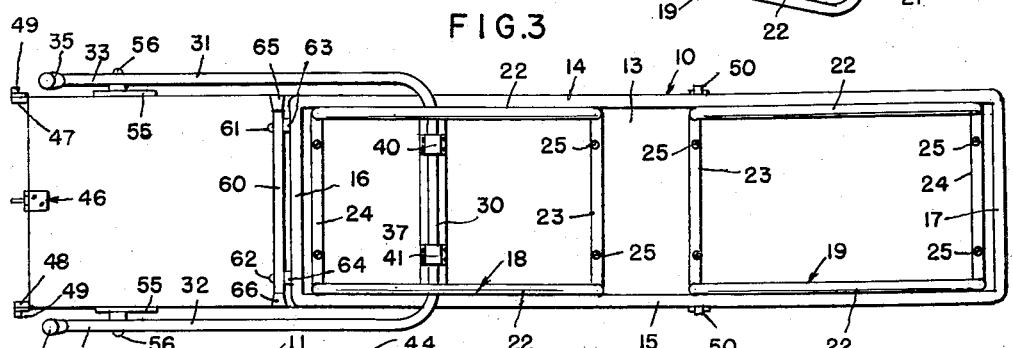
FIG.3
FIG.4
INVENTORS
William Ira Naxon
Amelio Frank LePore
George Evans Eddy
Joe Bill D'Angelo
BY
Shoemaker and Mattare
ATTORNEYS United States Patent Office 2,969,107
Patented Jan. 24, 1961

2,969,107

CONVERTIBLE SEAT

William Ira Naxon and Amelio Frank Le Pore, Dallas, and George Evans Eddy and Joe Bill D'Angelo, Mesquite, Tex., assignors to American Marine Upholstery Co., Dallas, Tex., a corporation of Texas Filed Feb. 4, 1960, Ser. No. 6,798

3 Claims. (Cl. 155—45)

This invention pertains to articles of furniture and, more particularly, to a convertible seat structure which is articulated so as to function in one position as a seat and in another position as a bed.

In many instances where there are restricted or confined quarters, it is desirable to have furniture both for seating purposes and for sleeping purposes. An example of such a situation is aboard a boat and the present invention is directed to a convertible seat structure capable of being made into a bed which is particularly well suited for use aboard a boat. In this fashion, the furniture may be converted during the day time to provide a comfortable seat assemblage and at night it is easily and quickly converted to use as a bed.

It is, therefore, of primary concern in connection with this invention to provide an article of furniture which is convertible from one position in which it may be utilized as a chair, and in another position in which it may be utilized as a bed.

A further object of this invention is to provide a convertible seat assemblage which presents, when erected as a seat, a pair of seats disposed in back-to-back relation and integrally interconnected and which, in another position, utilizes the seat back rest as an extension to effect sufficient length for the device so as to function as a cot or bed.

Another object of this invention is to provide an article of furniture convertible from use as a seat to use as a bed or cot in which the device, when used as a seat, occupies a predetermined length and in which the member acting as a back rest for the seat forms an extension when the device is used as a bed to extend the length beyond the stated predetermined length sufficiently long to function as a cot or bed.

Still another object of this invention resides in the provision of a convertible article of furniture for use either as a bed or as a seat in which the structure involved is of simple, yet effective and efficient design so as to enable its construction on an economical basis.

Still another object of this invention lies in the provision of a platform member having supporting legs and associated therewith a combined extension and back rest member, which combined member is positionable from a point extending transversely of the platform substantially intermediate its ends and in a vertical position so as to function as a back rest for both end portions of the platform, providing a dual seat, and wherein such combined member is also positionable to a substantially horizontal attitude disposed at one end of the platform and forming a bed or cot extension therefor, the means which supports the combined member in the horizontal position being in the nature of a pivoted yoke fixed to the platform and which constrains the combined member so as to be disposed in the stated two positions thereof.

A further object of this invention resides in the provision of a convertible article of furniture in accordance with the preceding paragraph wherein the combined member is pivotally attached to the yoke and wherein the combined member and platform are cooperable when the combined member is utilized as a back rest to preclude any pivotal motion between the yoke and the combined member and wherein a support element is disposed at one end of the platform to partially support the combined member when it is disposed in horizontal position.

As this invention may be embodied in several forms without departing from the spirt or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

In the drawing:

Fig. 1 is a perspective view of the convertible seat illustrating the relative disposition of its parts when used as a seat;

Fig. 2 is a perspective view of the assembly shown in Fig. 1, but illustrating the relative disposition of parts when the device is converted for use as a cot or bed;

Fig. 3 is a bottom view of the assembly as shown in Fig. 2 illustrating the details of construction thereof; and Fig. 4 is a partial perspective view illustrating the manner in which the combined head rest and extension member are partially supported directly from the platform.

Referring at this time more particularly to Figs. 1 and 2, the reference numeral 10 indicates in general a platform member which provides the main supporting structure for the article of furniture. Associated with this platform is a combined back rest and extension member 11 attached to the platform by means of a yoke assembly indicated generally by the reference character 12 and by means of which the combined member 11 is movable from the position shown in Fig. 1 wherein the same operates as a divider or back rest to provide a pair of seats as shown in Fig. 1, to the position shown in Fig. 2 in which it forms an extension for the platform 10 such that the over-all length of the device is sufficient to function and serve as a bed or cot.

As can be seen more clearly in Fig. 3, the platform 10 includes a rectangular, elongate top 13 having depending side walls 14 and 15 extending along the opposite side edges thereof and being provided with depending end walls 16 and 17. These several members may be constructed, for example, from plywood or the like so as to be relatively light weight and yet at the same time sufficiently rigid for the purposes intended and they may be covered with suitable upholstery, padding and the like so as to provide a convertible piece of furniture.

Preferably, two supporting leg assemblies indicated generally by the reference characters 18 and 19 are provided, each of which includes a pair of U-shaped portions presenting upstanding legs 20 and 21 interconnected by a horizontal runner 22 on either side of the platform 10, the upper extremities of the vertical or upstanding legs 20 and 21 being connected by horizontal cross pieces 23 and 24. These cross pieces are preferably secured directly to the undersurface of the top 13 as, for example, by fasteners 25.

The yoke assembly 12 includes a bight portion 30 from the opposite ends of which extend a pair of parallel arms 31 and 32 which terminate in laterally directed legs 33 and 34 preferably provided with rubber tips 35 and 36 at their extremities. A cross bar 37 extends between the lower edge of the side walls 14 and 15 and mounted on the underside thereof is a pair of pivot block members 40 and 41 which pivotally receive the bight portion 30 therethrough and serves to permit the same to be pivoted between the positions shown in Figs. 1 and 2.

The combined member 11, as can be seen more clearly in Fig. 4, includes a pair of parallel side walls 42. These side walls are connected adjacent their lower extremities by a bottom wall 43 and along their peripheral edges by a covering wall structure 44 which is preferably upholstered and padded, as desired, for the comfort of the user. The interior of the assembly 11 is thus hollow and to utilize the space therewithin, the bottom wall 43 may be hinged as at 45 to the covering wall 44 at one side of the device and detachably affixed thereto as by any suitable latch assembly indicated generally by the reference character 46 at the opposite side so that entry into this space may be had through the bottom wall 43 when the device is in the position shown in Fig. 4.

The side walls 42 are provided at their lower extremities with extensions 47 and 48, each of which is provided with a latch element 49 thereon cooperable with a hasp type clasp 50, see particularly Figs. 1 and 2, on the side walls 14 and 15 of the platform 10 so as to hold the member 11 in position relative thereto when the parts are in the position shown in Fig. 1.

Each side wall 42 is provided with a plate 55 carrying a laterally outwardly extending pivot pin 56 projected through and journalled in a respective leg 33 or 34 whereby the member 11 is pivotally supported between the legs 33 and 34. The platform 10 is provided at either side thereof and intermediate its opposite ends with open sided wells 57 and 58 which receive the extensions 47 and 48 so that when the member 11 is in the position shown in Fig. 1, and the extensions received in such wells, with the clamps 50 engaged with the latch members 49, the member 11 will be held upright and fixed against any pivotal action relative to the legs 33 and 34.

The end of the platform 10 is provided with a horizontal supporting bar 60 fixed rigidly to the end wall 16 thereof by the fasteners 61 and 62, with spacing members or blocks 63 and 64 being utilized to position the bar 60 outwardly from the end wall 16. Preferably, the opposite ends of this bar 60 are provided with cushioning elements or tips 65 and 66. The purpose of the bar 60 is to provide a support for the apical end portion 70 of the member 11 when the parts are in the position shown in Figs. 2 and 4, thus stabilizing the member 11 in this position.

We claim:

1. A convertible article of furniture comprising an elongate horizontally disposed platform, said platform having a top wall and depending side walls, supporting leg assemblies secured to the undersurface of said top wall for supporting said platform in elevated position, a yoke assembly including a bight portion traversing said platform and pivotally secured thereto between the lower edges of said side walls and including a pair of elongate arms extending from the bight portion, a combined back rest and extension member pivotally secured between the free ends of said arms so as to be movable between one position in which the combined member is disposed intermediate the ends of the platform in upstanding relation thereto and a position in which the combined member is horizontally disposed beyond one end of the platform so as to form an extension thereof, cooperating fastening means carried by the combined member and the side walls to hold the combined member intermediate the ends of the platform, the free ends of said arms terminating in leg portions serving to support said combined member when the same is in its horizontally disposed position forming an extension for the platform.

2. A convertible article of furniture comprising an elongate horizontally disposed platform, said platform having a top wall and depending side walls, supporting leg assemblies secured to the undersurface of said top wall for supporting said platform in elevated position, a yoke assembly including a bight portion traversing said platform and pivotally secured thereto between the lower edges of said side walls and including a pair of elongate arms extending from the bight portion, a combined back rest and extension member pivotally secured between the free ends of said arms so as to be movable between one position in which the combined member is disposed intermediate the ends of the platform in upstanding relation thereto and a position in which the combined member is horizontally disposed beyond one end of the platform so as to form an extension thereof, cooperating fastening means carried by the combined member and the side walls to hold the combined member intermediate the ends of the platform, the free ends of said arms terminating in leg portions partially serving to support said combined member when the same is in its horizontally disposed position forming an extension for the platform, and a supporting means transverse of the platform beyond one end thereof to effect the remainder of the support for said combined member.

3. A convertible article of furniture comprising an elongate horizontally disposed platform, said platform having a top wall and depending side walls, supporting leg assemblies secured to the undersurface of said top wall for supporting said platform in elevated position, a yoke assembly including a bight portion traversing said platform and pivotally secured thereto between the lower edges of said side walls and including a pair of elongate arms extending from the bight portion, a combined back rest and extension member pivotally secured between the free ends of said arms so as to be movable between one position in which the combined member is disposed intermediate the ends of the platform in upstanding relation thereto and a position in which the combined member is horizontally disposed beyond one end of the platform so as to form an extension thereof, the opposite sides of said platform being provided with open sided wells intermediate the ends of the platform, said combined member having at its lower end extensions projecting into said wells, and means for releasably fixing the combined member to the platform with such extensions in the wells when the combined member is disposed intermediate the ends of the platform, the free ends of said arms terminating in angulated leg portions serving to partially support said combined member when the same is in its horizontally disposed position forming an extension for the platform, and a supporting member extending transversely of said platform beyond said one end thereof to effect the remainder of the support for said combined member.

References Cited in the file of this patent

UNITED STATES PATENTS

| | | |
|---|---|---|
| 794,345 | Coopersmith | July 11, 1905 |
| 1,043,552 | Van Derzee | Nov. 5, 1912 |
| 1,271,701 | Griffith | July 9, 1918 |
| 2,104,666 | Molnar | Jan. 4, 1938 |
| 2,503,527 | Van Camp | Apr. 11, 1950 |
| 2,754,888 | Palme | July 17, 1956 |

FOREIGN PATENTS

| | | |
|---|---|---|
| 51,474 | Denmark | Mar. 30, 1936 |